July 16, 1946.  A. DE W. BEST  2,404,028
ELECTRIC WELDING ROD HOLDER
Filed Sept. 5, 1944  2 Sheets-Sheet 2
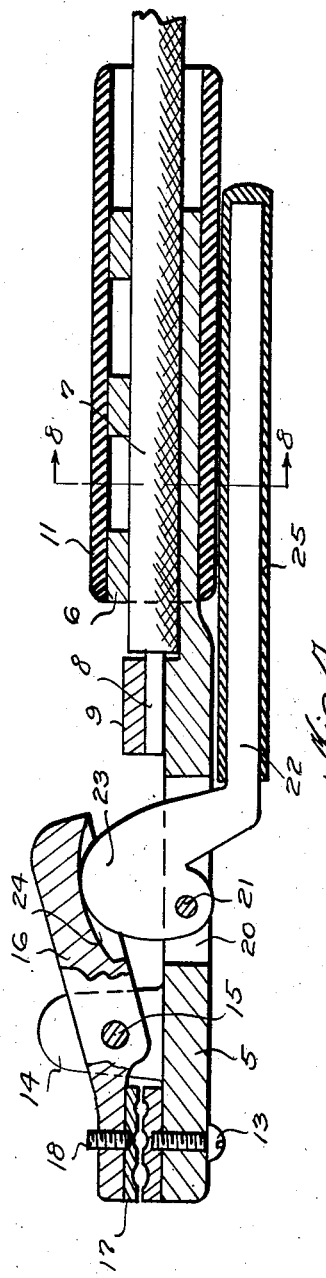
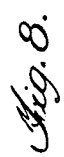
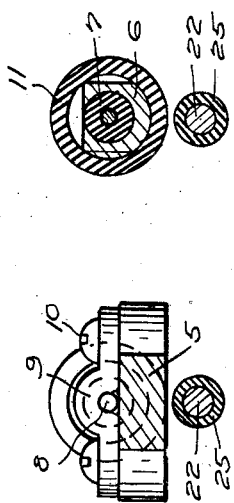
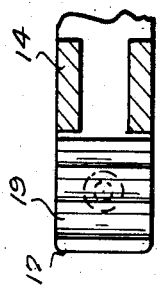
Inventor
ALBERT DEWAIN BEST,
By *Clarence A. O'Brien*
*and Harvey B. Jacobson*
Attorneys Patented July 16, 1946

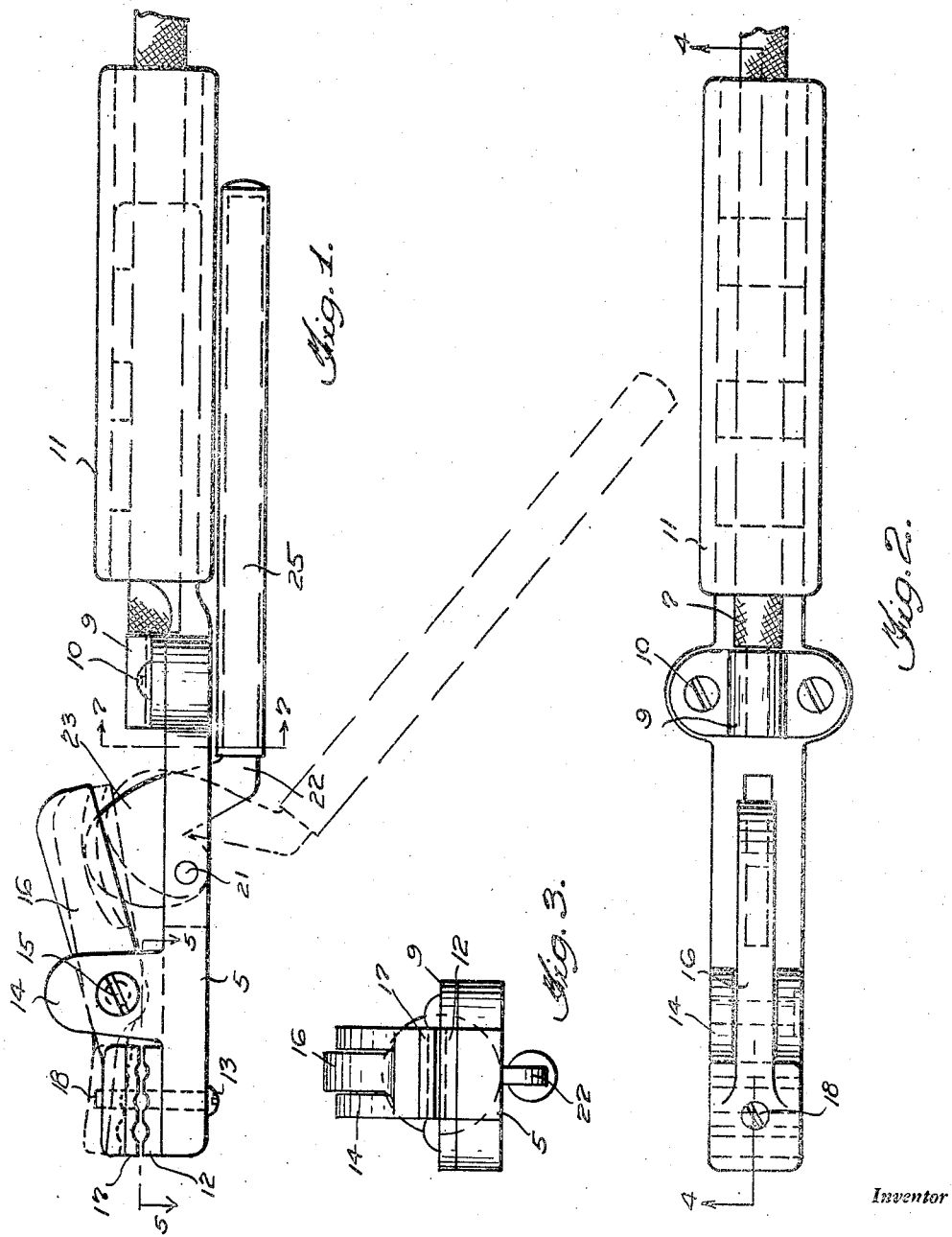

2,404,028

UNITED STATES PATENT OFFICE 2,404,028

ELECTRIC WELDING ROD HOLDER

Albert De Wain Best, Sandusky, Ohio

Application September 5, 1944, Serial No. 552,777

1 Claim. (Cl. 219—8)

The present invention relates to new and useful improvements in welding rod holders of a type used for general welding purposes and the invention has for its primary object to provide a pivoted jaw carried by the holder and adapted for firmly clamping the rod in position together with a lever having a camming engagement with the jaw to exert a desired closing pressure thereon whereby to hold the electric rod against any loose play which has a tendency to heat the holder and reduce the effectiveness of the welding action.

A further object of the invention is to provide a welding rod holder of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a front end elevational view.

Figure 4 is a longitudinal sectional view taken substantially on a line 4—4 of Figure 2.

Figure 5 is a fragmentary sectional view of the jaws taken substantially on a line 5—5 of Figure 1.

Figure 6 is a perspective view of one of the removable jaw faces, and

Figures 7 and 8 are transverse sectional views taken respectively on the lines 7—7 of Figure 1, and 8—8 of Figure 4.

Referring now to the drawings in detail wherein for the purpose of illustration I have disclosed a preferred embodiment of the invention, the numeral 5 designates an elongated frame having a plurality of longitudinally spaced annular members 6 formed at one end adapted for receiving an electric cable 7, the core 8 of the cable being clamped to the frame by a clamping plate 9 secured to the frame by screws 10. An insulation sleeve 11 is fitted over the attached end of the cable and the annular members 6 to form a handle.

To the outer end of the frame 5 is secured a removable jaw face 12 by means of a screw 13 and rising from the frame inwardly of the jaw face 12 is a pair of ears 14 having a pin 15 extending therebetween on which a jaw 16 is pivotally mounted. The front end of the jaw 16 overlies the jaw face 12 and the underside of the front end of the jaw 16 is likewise provided with a removable jaw face 17 secured thereto by a screw 18. The jaw faces 12 and 17 are preferably constructed of copper and the opposed surfaces of the jaw faces are formed with grooves 19 adapted for receiving electrode rods of various sizes, the grooves extending transversely of the frame.

An opening 20 is formed in the frame 5 immediately rearwardly of the upstanding ears 14 and in which a pin 21 is positioned and to which one end of a lever 22 is pivotally mounted.

The pivoted end of the lever is formed with a cam 23 on one edge which projects upwardly through the opening 20 of the frame and is seated in a recess 24 on the underside of the rear end of the jaw 16. The lever 22 extends longitudinally under the frame 5 and is enclosed in an insulation sleeve 25.

The rear end of the jaw 16 is weighted sufficiently to gravitate downwardly toward the frame 5 whereby to release the jaw when disengaged by the cam 23.

Accordingly, in the operation of the device the electrode rod is placed in one of the grooves 19 between the jaw faces 12 and 17 and the lever 22 then moved upwardly toward the frame 5 into the position as shown by the full lines in Figure 1 of the drawings, whereby the cam 23 will raise the rear end of the jaw 12 and cause the front end thereof to move downwardly into clamping engagement with the electrode rods.

Upon a movement of the lever 22 downwardly into the position as shown by the dotted lines in Figure 1 the cam 23 will release the rear end of the jaw 16 and permit said rear end of the jaw to gravitate downwardly whereby to release the electric rods.

It is believed that the details of construction and manner of use of the device will be readily understood from the foregoing without further detailed explanation.

Having thus described the invention, what I claim is:

An electrode rod holder comprising an elongated frame having a handle at one end, means for attaching an electric cable to the frame, the other end of the frame constituting a stationary jaw, a movable jaw pivoted intermediate its ends to the frame on one side thereof for engagement of one end thereof with said stationary jaw for clamping an electrode rod thereto and a lever mounted on said frame for swinging on the other side thereof toward the same in the plane of the frame, the mounting for said lever comprising an end cam thereon extending through and pivoted to the frame to engage the other end of the movable jaw, said cam pivoting in the plane of the movable jaw, said movable jaw having a recess in said other end thereof in which said cam seats to obviate relative side play of the movable jaw and the cam.

ALBERT DE WAIN BEST.